United States Patent [19]

Krueger et al.

[11] Patent Number: 4,588,648

[45] Date of Patent: May 13, 1986

[54] MULTIPLE LAYER PLASTIC FILM HAVING POLYPROPYLENE ADHERED TO NYLON

[75] Inventors: Duane A. Krueger, Neenah; Thomas W. Odorzynski, Green Bay, both of Wis.

[73] Assignee: American Can Company, Greenwich, Conn.

[21] Appl. No.: 635,630

[22] Filed: Jul. 30, 1984

Related U.S. Application Data

[60] Division of Ser. No. 417,674, Sep. 13, 1982, Pat. No. 4,552,714, and a continuation-in-part of Ser. No. 236,601, Feb. 20, 1981, Pat. No. 4,361,628.

[51] Int. Cl.$^4$ .......................................... B32B 27/08
[52] U.S. Cl. ........................ 428/475.8; 428/476.1; 428/516; 264/176 R
[58] Field of Search ............... 428/516, 476.1, 475.8

[56] References Cited

U.S. PATENT DOCUMENTS

| | | | |
|---|---|---|---|
| 4,405,667 | 9/1983 | Christensen et al. | 428/476.1 |
| 4,407,873 | 10/1983 | Christensen et al. | 428/476.1 |
| 4,416,944 | 11/1983 | Adur | 428/522 |

*Primary Examiner*—P. C. Ives
*Attorney, Agent, or Firm*—Stuart S. Bowie; Thomas D. Wilhelm

[57] ABSTRACT

A novel coextruded plastic film has, as an adhesive layer between polypropylene and nylon layers, a blend of polypropylene and a graft copolymer of maleic anhydride onto an olefin polymer or copolymer, the adhesive blend containing from about 0.005% to 0.75% maleic anhydride based on the total weight of the entire blend composition.

7 Claims, 2 Drawing Figures

MULTIPLE LAYER PLASTIC FILM HAVING POLYPROPYLENE ADHERED TO NYLON

This is a continuation-in-part of application Ser. No. 236,601, filed Feb. 20, 1981, issued as Pat. No. 4,361,628 on Nov. 30, 1982, for COEXTRUDED FILM OF POLYPROPYLENE, POLYPROPYLENE BLEND, AND NYLON, By Duane A. Krueger et al and a divisional of application Ser. No. 417,674, filed Sept. 13, 1982, now U.S. Pat. No. 4,552,714.

BACKGROUND OF THE INVENTION

This invention pertains to coextruded plastic films, and particularly, to those films having a polypropylene layer adhered to a layer of a nylon-type polyamide. In such films, the adhesion between the nylon and polypropylene layers has been particularly troublesome. It has been surprisingly found that an excellent adhesive for the coextrusion of nylon and polypropylene is a blend of a graft copolymer of maleic anhydride onto an olefin polymer or copolymer and an ungrafted propylene-based polymer. The graft copolymer typically contains from about 0.10% to about 2.5% maleic anhydride based on the total weight of the graft copolymer, and must contain from about 0.005% to 0.75% maleic anhydride based on the total weight of the entire blend composition.

In the coextrusion of a 5-layer film, the structure may include a fourth layer, of ethylene vinyl alcohol copolymer (EVOH), affixed on one of its surfaces to the nylon, and a fifth layer, of nylon, affixed to the other surface of the EVOH.

Thus the process comprises coextruding polypropylene, and nylon with the adhesive blend juxtaposed therebetween. In the formation of a five layer structure containing EVOH, the process comprises coextruding the five layer structure of, in sequential order in the structural layering, from one outside surface to the other: polypropylene, adhesive blend, nylon, EVOH, and nylon.

DETAILED DESCRIPTION OF THE INVENTION

Figure 1:
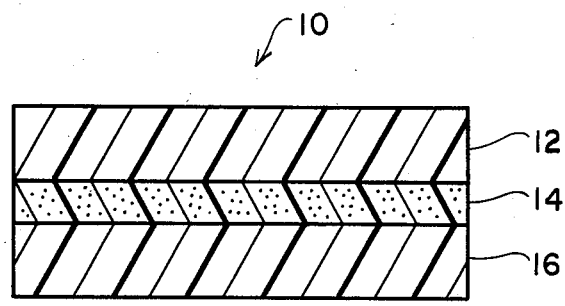
FIG. 1 is a cross-section of a three layer coextruded structure of this invention.

The most basic form of the invention is shown in the coextruded structure of FIG. 1, which is generally designated 10. The structure has three layers which are, respectively, a polypropylene layer 12, an adhesive blend layer 14 of a maleic anhydride graft copolymer of an olefin and an ungrafted polypropylene, and a nylon layer 16.

Layer 12 may be polypropylene homopolymer, a propylene ethylene copolymer, or a blend of polypropylene and polyethylene. In any event, the ethylene content may be up to about 50% by weight of the layer 12 composition. The polymer resin, or blends of resin, must, of course, be extrudable polymers. A preferred polymer for layer 12 is sold under the tradename of Hercules SA-752, which also contains about 4% ethylene. Another suitable polymer is Eastman 4G7DP, which contains small amounts of ethylene vinyl acetate.

Layer 16 is a polymer, copolymer, or blend thereof selected from the nylon family of polyamides. Very desirable polymeric compositions for layer 16 are nylon 6, nylon 66, and nylon 6,66, blends of nylon 6 with less than 25% nylon 12, and blends of at least about 75% nylon 6. Examples of materials which can be processed with nylon 6 as a blend are high density polyethylene, medium density polyethylene, or low density polyethylene and polypropylene. In general, any extrudable polymer may be satisfactorily used in a blend with the nylon so long as it neither degrades at the processing temperature of about 500° F. to about 530° F., nor reacts appreciably with the nylon 6.

Less desirable, but acceptable, are copolymers of nylon 6 and nylon 12. Unacceptable for layer 16 is nylon 12.

Processing additives such as slip agents and the like may be satisfactorily used.

Layer 14 serves as a coextruded adhesive layer between layers 12 and 16. It forms a strong bond with both layers 12 and 16. Layer 14 is a blend of two components: (1) a grafted copolymer of an olefin and maleic anhydride and (2) an ungrafted propylene-based polymer. The ungrafted propylene-based polymeric component (2) may be a polypropylene homopolymer, a propylene ethylene copolymer, or a blend of polypropylene and polyethylene. In any event, the ethylene content may be up to about 50% by weight of the ungrafted propylene-based component (2) of the blend. The term "ungrafted" as used herein limits the polymer in the sense that no significant anhydride moieties have been grafted thereon. Other polymeric grafts may optionally be present.

The grafted copolymer component (1) of the blend has a backbone, or chain, comprising an olefinic polymer or copolymer, with units of maleic anhydride having been grafted thereonto. For use in this invention, the graft copolymer component of the blend typically will contain from 0.1% to 2.5% maleic anhydride based on the total weight of the graft copolymer. One such graft copolymer suitable for use in this invention as component (1) of the blend is sold by Hercules Chemical Company as Hercoprime A-35. Other suitable copolymers based on propylene are sold by Mitsui Company, Japan, as QF-500 and QF-500X. Still other polymers are based on ethylene, such as ethylene copolymers and ethylene blends. Representative of these materials are those available from Chemplex Company under the Plexar tradename and from DuPont Company under the designation CXA.

The formulations of layers 12 and 14 may be advantageously effected by formulating polymeric compositions for layers 12 and 14 which compositions have similar basic polymeric structure. Thus, if it is found advantageous to have a high fraction of ethylene in layer 12, then the overall fraction of ethylene in layer 14 is advantageously greater than in cases where the ethylene fraction in layer 12 is relatively smaller.

While the ethylene content of the grafted copolymer is advantageously selected with regard to the ethylene contents of layer 12 and of the ungrafted polypropylene component, ethylene contents up to about 20% of the grafted copolymer may be used with any of the combinations of layer 12 composition and ungrafted copolymer composition. Ethylene contents between 20% and 50% of the grafted copolymer are used with compositions of ungrafted polypropylene component and layer 12 which include larger fractions of ethylene moieties.

The blend for coextrusion as layer 14 in the coextruded structure is typically from about 5% to about 30% by weight of the maleic anydride grafted copolymer, preferably about 5% to about 10%, and from about 70% to about 95% of the ungrafted polypropylene, preferably about 90% to about 95%. Most significantly, overall maleic anhydride concentration in the blend layer 14, based on the entire blend composition, is from about 0.005% to about 0.75%, with a preferred maleic anhydride concentration range of about 0.005% to about 0.25%. To the extent the anhydride modification may be different from the iterated 0.1% to 2.5%, the fraction of the grafted copolymer in the blend is adjusted so that the anhydride concentration in the overall adhesive blend composition is within the above iterated percentage.

In the preferred extrusion process the components of the individual layers are fed into extruders of like number, each extruder handling the material for one of the layers. As in the case of the five layer structure, illustrated, where two layers are identical, one extruder may handle the two identical layers. The melted and plasticated streams from the individual extruders are fed into a multiple manifold coextrusion die. The layers are juxtaposed and combined in the die, and exit the die as a single multiple layer film of polymeric material.

After exiting the die, the polymeric material is cast onto a first controlled temperature roll, passes around the first roll, and thence onto a second controlled temperature roll, which is normally cooler than the first roll. The controlled termperature rolls largely control the rate of cooling of the film after it exits the die. Typical operating temperatures for the first and second controlled temperature rolls are 160° F. and 120° F. respectively.

Figure 2:
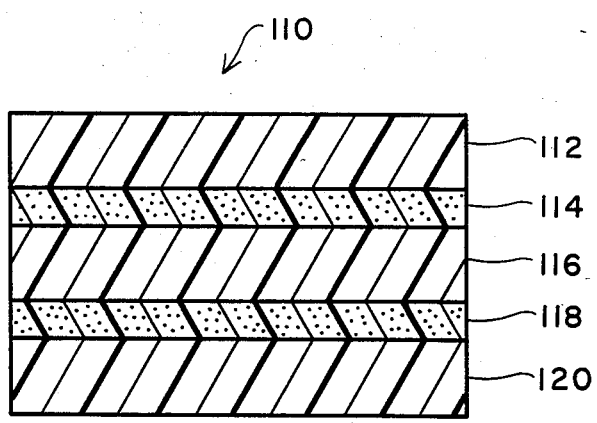
FIG. 2 is a cross-section of a five layer coextruded structure of this invention.

In another embodiment of the invention illustrated in FIG. 2, a five-layer structure is coextruded, wherein similar 100 series numbers represent similar layers in FIG. 1. Thus the entire structure is generally designated 110. Layers 112, 114, and 116 have the same compositions, and serve the same functions as layers 12, 14, and 16 respectively in FIG. 1. Layer 118 is a material providing an effective barrier to gaseous transmission, such as EVOH. Layer 120 is a layer of nylon, and may be any nylon which may be coextruded with the gas barrier material.

EXAMPLE 1

Five parts by weight of Hercoprime A-35 particles were blended with 95 parts by weight of pelletized Hercules SA-752 ungrafted polypropylene polymer to form the adhesive blend composition. A three layer film was cast coextruded through a 3-manifold cast die fed by three extruders processing, respectively, nylon 6, the above recited blend, and Hercules SA-752 polypropylene. Die temperature was 500° F. Line speed was 60 feet per minute. The film was cast onto a first controlled termperature chill roll maintained at 160° F., and passed from there onto a second chill roll at 120° F. The final film was 4.5 mils thick. The outer layers were 3.5 mils SA-752 polypropylene and 0.5 mil nylon, with a 0.5 mil layer of the blend serving as the adhesive layer between them.

EXAMPLE 2

A three layer 4.5 mil film was cast coextruded as in EXAMPLE 1, using as the nylon layer a blend of 75% Nylon 6 and 25% Nylon 12.

EXAMPLE 3

A three layer, 4.5 mil, film was cast coextruded as in EXAMPLE 1, using as the adhesive blend a composition of 10 parts by weight Hercoprime A-35 and 90 parts by weight SA-752.

EXAMPLE 4

A three layer, 4.5 mil, film was cast coextruded as in EXAMPLE 2, using as the adhesive blend a composition of 10 parts by weight Hercoprime A-35 and 90 parts by weight SA-752.

EXAMPLE 5

Five parts by weight of Hercoprime A-35 particles were blended with 95 parts by weight of pelletized Hercules SA-752 polypropylene to form the adhesive blend composition. Using four extruders, a 3-manifold cast die, and a combining head, a five layer film was cast coextruded. One extruder fed an SA-752 polypropylene stream into the die. Another extruder fed a stream of the adhesive blend into the die. The third stream was generated by two extruders feeding the nylon and EVOH into the combining head. In the combining head, the extrudates from the two extruders were combined into a three-layer stream having nylon on its outer portions and a core layer of EVOH. Combining head temperature was 500° F. The three-layer stream was fed from the combining adaptor into the 3-manifold die, where it was juxtaposed, and finally, joined with the adhesive blend layer. Die temperature was 500° F. The final five-layer film was cast onto a first controlled temperature chill roll maintained at 160° F., and passed from there onto a second chill roll at 120° F. Line speed was 60 feet per minute. The final film was 5 mils thick and had the following distinct layers, in order:
polypropylene: 3.5 mils
adhesive blend: 0.5 mil
Nylon 6: 0.25 mil
EVOH: 0.5 mil
Nylon 6: 0.25 mil

EXAMPLE 6

A five-layer, 5 mil, film was cast coextruded as in EXAMPLE 5, using, as the nylon layers, a blend of 75% Nylon 6 and 25% Nylon 12.

EXAMPLE 7

A five-layer, 5 mil, film was cast coextruded as in EXAMPLE 5, using as the adhesive blend a composition of 10 parts by weight Hercoprime A-35 and 90 parts by weight SA-752.

EXAMPLE 8

A five layer, 5 mil, film was cast coextruded as in EXAMPLE 6, using as the adhesive blend a composition of 10 parts by weight Hercoprime A-35 and 90 parts by weight SA-752.

The adhesive bond between layers 14 and 16 was measured as peel strength in pounds per one inch width strip of specimen. In preparation for the peel test, specimens were cut into one inch strips. They were then tested in a Chatillon tester, manufactured by John Chatillon and Sons, N.Y. Crossing head speed was 10 inches per minute. The resulting peel strengths of all the samples were 2 lbs./in. width, with a range of 1.8 to 2.1 lb./in. width.

Having thus described the invention, what is claimed is:

1. A multiple layer plastic film, comprising:
   (a) a layer of polypropylene;
   (b) a layer of nylon; and
   (c) a functionally adhesive layer juxtaposed between said nylon layer and said polypropylene layer, said adhesive layer being a blend consisting essentially of (i) a graft copolymer of maleic anhydride onto an olefin polymer or copolymer and (ii) an upgrafted propylene-based polymer; and adhesive blending containing from about 0.005% to 0.75% maleic anhydride based on the total weight of the entire blend composition.

2. A plastic film as in claim 1 wherein the polypropylene layer in subparagraph (a) contains polyethylene up to about 50%.

3. A plastic film as in claim 1 and including an additional layer of ethylene vinyl alcohol copolymer affixed on one of its surfaces to said nylon, and a further layer of nylon affixed to the other surface of said ethylene vinyl alcohol copolymer.

4. A plastic film as in claim 2 and including an additional layer of ethylene vinyl alcohol copolymer affixed on one of its surfaces to said nylon, and a further layer of nylon affixed to the other surface of said ethylene vinyl alcohol copolymer.

5. A plastic film as in claim 1 wherein said ungrafted propylene-based polymer contains less than 20% ethylene moieties by weight and wherein said graft copolymer contains 0.1% to 2.5% maleic anhydride based on the total weight of the graft copolymer, said graft copolymer comprising between about 5% and 30% by weight of the blend, and said ungrafted propylene-based polymer comprising between about 70% and 95% by weight of the blend.

6. A plastic film as in claim 5 wherein the polypropylene layer in subparagraph (a) contains up to about 50% ethylene.

7. A plastic film as in claim 5 and including an additional layer of ethylene vinyl alcohol copolymer affixed on one of its surfaces to said nylon, and a further layer of nylon affixed to the other surface of said ethylene vinyl alcohol copolymer.

* * * * *